(No Model.) 2 Sheets—Sheet 1.

J. S. SMITH & C. J. & G. E. TATE.
FASTENING DEVICE FOR PNEUMATIC TIRES.

No. 504,284. Patented Aug. 29, 1893.

Witnesses.
G. H. Reafern
John E. Dousfield.

Inventors
John S. Smith and
Christopher J. Tate
George E. Tate
By Whitaker & Prevost Attys.

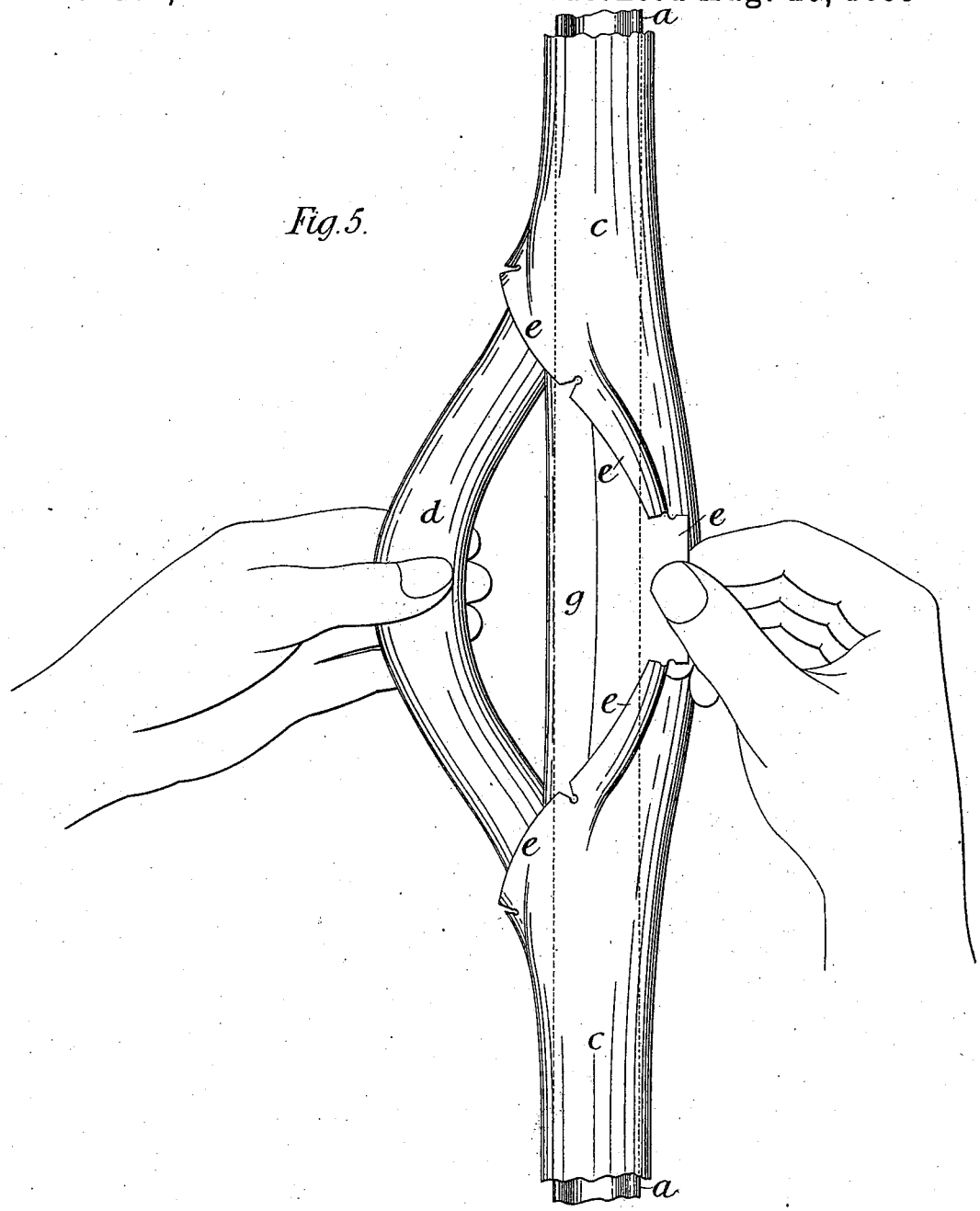

United States Patent Office.

JOHN SAMUEL SMITH, CHRISTOPHER JOHN TATE, AND GEORGE EDWARD TATE, OF LONDON, ENGLAND; SAID CHRISTOPHER JOHN TATE AND GEORGE EDWARD TATE ASSIGNORS TO SAID SMITH.

FASTENING DEVICE FOR PNEUMATIC TIRES.

SPECIFICATION forming part of Letters Patent No. 504,284, dated August 29, 1893.

Application filed January 24, 1893. Serial No. 459,532. (No model.)

*To all whom it may concern:*

Be it known that we, JOHN SAMUEL SMITH, CHRISTOPHER JOHN TATE, and GEORGE EDWARD TATE, subjects of the Queen of Great Britain, residing at London, England, have invented new and useful Improvements in the Attachment of Pneumatic Tires to their Rims, of which the following is a specification.

Our invention relates to improvements in the attachment of pneumatic tires to their rims.

In carrying out our invention we form upon or attach to the jacket or outer covering of the tire at or near the edges thereof a series of loops or pockets of a width designed to enter between the spokes of the wheel. Through these loops or pockets we introduce wire, preferably in short lengths, in such a manner as to engage with the spokes of the wheel.

In practice we find it advantageous to make the jacket or covering of sufficient width that when applied to the rim the edges will slightly overlap, the loops or pockets upon one edge of the said jacket or covering at one side of the rim passing between the spokes towards the other side of the rim and vice versa, the wires being passed through the loops or pockets.

To enable our invention to be fully understood we will describe the same by reference to the accompanying drawings, in which—

Figure 1:
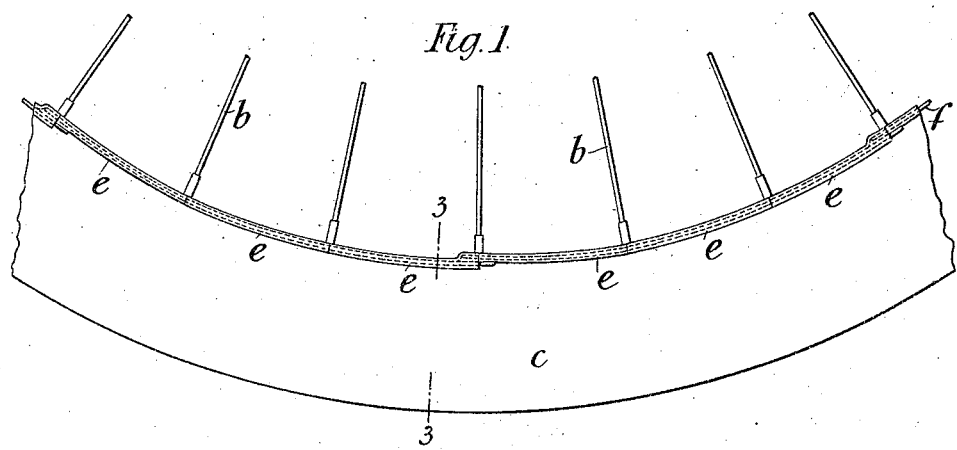
Figure 2:
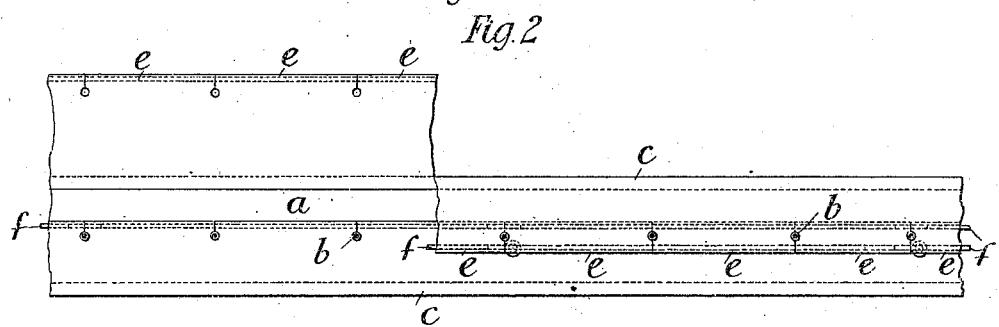
Figure 3:
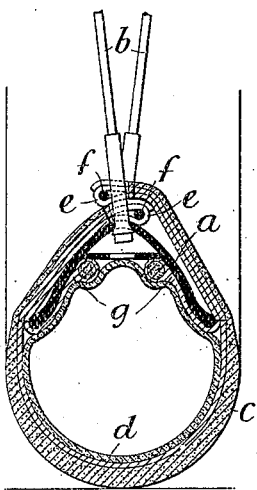
Figure 4:
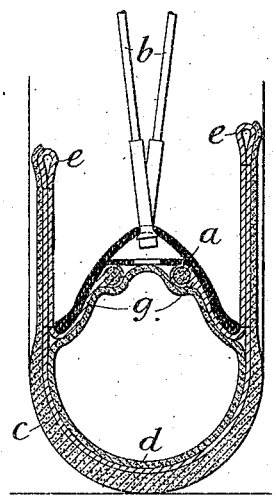

Figure 1 is an elevation of a portion of a wheel having the tire secured thereto in accordance with our invention; and, Fig. 2 is a plan of the same, part of the jacket or outer covering being turned back. Fig. 3 is a section drawn to an enlarged scale on the line 3—3 Fig. 1; and, Fig. 4 is a view similar to Fig. 3 but showing the edges of the jacket disconnected. Fig. 5 is a view showing how the cover is removed to enable the air-chamber to be withdrawn.

$a$ is the rim of the wheel, and $b, b$ are the spokes.

$c$ is the jacket or outer covering of the tire, and $d$ is the air-chamber.

$e, e$ are the loops or pockets formed upon the edges of the said jacket $c$, the said loops or pockets being of a width designed to enter between the spokes, as shown in Figs. 1 and 2.

$f, f$ are the wires by means of which the tires are secured, the said wires, as shown, being made of a length to pass over four spokes, but it is obvious that the length of the wires may be varied to suit the spacing of the spokes.

In applying the tire one edge thereof, say the left hand edge as shown in Fig. 3, is drawn over the rim and between the spokes and then wires are passed through the pockets on the right hand side of the said spokes; the right hand edge of the jacket is then pulled over the other edge of the same and secured by wires on the left hand side of the spokes. In practice we prefer that each wire should have at one end a loop by means of which it can be manipulated and that when the wires are applied the other end thereof should just enter the pocket of the adjacent wire.

In order to withdraw the air-chamber or a portion thereof in case it is punctured, one or more of the wires immediately adjacent to the air-chamber to be withdrawn is or are removed and then the covering can be pulled back, as shown in Fig. 5.

$g, g$ are bracing flaps secured to the inside of the cover and designed to prevent the tire from bulging immediately adjacent to the rim. These flaps, however, form the subject matter of an application of even date with this application and therefore no claim is made to them in this application.

Having now particularly described and ascertained the nature of our said invention and in what manner the same is to be performed, we declare that what we claim is—

The attachment of pneumatic tires to the rims of wheels by means of wires passed through pockets in the edges of the jacket or cover of the tire and engaging with the spokes of the wheel, substantially as described and illustrated.

JOHN SAMUEL SMITH.
CHRISTOPHER JOHN TATE.
GEORGE EDWARD TATE.

Witnesses:
G. F. REDFERN,
JOHN E. BOUSFIELD,
*Of the firm of G. F. Redfern & Co., 4 South Street, Finsbury, London, Patent Agents.*